Nov. 28, 1939.    G. W. CROWELL    2,181,692
SPRING SUSPENSION FOR AUTOMOBILES
Filed April 27, 1938

INVENTOR
Gordon Walcott Crowell
BY
ATTORNEY

Patented Nov. 28, 1939

2,181,692

UNITED STATES PATENT OFFICE 2,181,692

SPRING SUSPENSION FOR AUTOMOBILES

Gordon Walcott Crowell, Belleville, N. J.

Application April 27, 1938, Serial No. 204,518

8 Claims. (Cl. 267—16)

This invention relates to improvements in spring suspensions for vehicles, particularly automobiles.

The new spring suspensions of the invention are particularly adapted for use in automobiles provided with a torque-tube drive; but they may be used in other vehicles provided with suitable radius rods or other devices adapted to brace the axles; or in other types of vehicles. The improved suspensions may be used either in the front or the rear of a vehicle, and advantageously are used for both the front and rear suspensions. They may be used either with front wheel or rear wheel drive automobiles, suitable adjustments being made, of course, to adapt the suspensions to the particular construction involved.

The new spring suspensions have a number of important advantages over those heretofore proposed or used. They impart to the vehicle riding qualities similar to those of vehicles provided with soft springs when light bumps or shocks are encountered; and also impart riding qualities similar to those of vehicles equipped with hard, i. e., strong or stiff springs for severe shocks. The riding qualities of vehicles provided with these spring suspensions are more uniform with light and heavy loads. The construction of the new spring suspensions is such that they positively limit the distance of rebound after a shock by a snubbing action. In their preferred form, which has a number of important advantages, the new spring suspensions effectively prevent or radically diminish body leaning and lateral motion or side sway, keeping the axles in alignment with the frame without requiring the provision of such special device to prevent such body leaning or side sway.

In accordance with the present invention, there is provided at the extremities of the axle, either the front axle or the rear axle, or both, springs mounted directly between the frame of the vehicle and the axle. Such springs may be of the usual construction, that is, may be leaf springs mounted longitudinally or transversely, but advantageously are helical springs. If a transverse spring be used, a single spring extending from one end of the axle to the other may be used instead of a spring at each extremity of the axle. Such springs should be of such stiffness that they support the body and chassis of the vehicle under ordinary conditions; but should be too soft to prevent the axle from striking the usual rubber bumper when a severe bump or shock is met.

There is also provided at each end of the axle (both front and rear axles if the new suspension is used on both front and rear, either the front or rear axle only, if the new suspension is used for only the front or rear) a supplemental spring member. This supplemental spring member is a slightly bowed or arcuate flat spring, similar in nature to a single leaf of an ordinary leaf spring, although it may include more than one leaf if desired. This supplemental spring is anchored to the frame at one end, and is connected at the other end to the axle in any suitable way, advantageously by the use of a shackle, more or less similar to the shackle ordinarily used for fastening in place the leaf springs commonly used. Advantageously, the supplemental spring members are mounted transversely, and are fastened to the cross member of the frame of the vehicle, a single member extending from one extremity of the axle to the other, anchored at the center to the frame cross member thus serving as the supplemental spring members for both sides of the vehicle. Above the supplemental spring member, and in alignment with it, is mounted a suitable frame member, which may be the cross member of the frame, or an added member, so located above the supplemental spring member that as the distance between the axle and the frame is decreased, the supplemental arcuate spring member tends to progressively flatten into contact with the frame member, so that its effective length is shortened. The usual double-acting shock absorbers should be used in connection with these new spring suspensions.

This construction is such that normally practically all of the load is carried by the helical or other springs provided. When the vehicle goes over a bump, the supplemental spring member rolls on or flattens against the frame member, its length decreasing, and hence its resistance to further deformation rapidly increasing, so that as the distance between the axle and the frame decreases, the proportion of the shock absorbed by the supplemental spring member increases very rapidly. With a slight shock, the supplemental spring member offers comparatively little resistance, and the normal spring absorbs most of the shock; whereas with a severe shock, the supplemental spring member absorbs a greater portion of the shock. The combined effect of the springs is such that the suspension is comparable to a soft spring suspension for slight shocks, and to a hard spring suspension for heavy shocks.

When rebound occurs, with the distance between the frame and the axle increasing, the shackle by which the supplemental spring member is attached to the axle tends to assume a straight angle with the supplemental spring. Further rebound, or increase of distance between the frame and the axle, can then take place only if the supplemental spring is flattened out by the tension imposed. As the resistance of the spring to such action is very great, there is a positive snubbing action, which greatly limits the rebound. Nevertheless, in view of the arcuate shape of the supplemental spring, and its resiliency, the snubbing action, though positive, is cushioned, so no sudden strain is imposed because of the snubbing action.

If the supplemental spring members are mounted transversely, and particularly if made of a single, integral leaf fastened at its extremities to the axle, and at the center to the frame member, the tendency of the vehicle to side sway, or lean when turning, is effectively prevented or minimized to such an extent as to be unobjectionable and to make unnecessary the provision of separate means to prevent such side sway or leaning. Lateral relative movement of the axles and the frame is prevented because such movement places the supplemental spring members under tension; and the resistance of these members to elongation is such as to prevent any noticeable lateral motion. Leaning of the body, as when turning, is prevented, or minimized, by the resistance of the supplemental member on one side of the car to compression, because of its rolling or flattening action against the frame cross member. Such construction thus has important advantages.

It will be noted that the supplemental spring members require no lubrication, are not affected by dirt or lack of lubrication, and are cheap and easy to manufacture. If used in connection with helical springs, the entire spring suspension of the vehicle may be such as to require no lubrication and to be unaffected by dirt, moisture, or weather conditions.

The invention will be further described in connection with the accompanying drawing, which illustrates a preferred form of the invention as applied to the rear of an automobile provided with a torque-tube drive.

Figure 1:
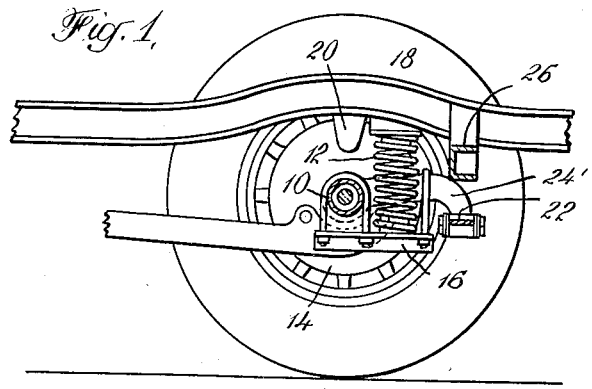
Fig. 1 is a side view, with parts in section, showing a spring suspension which embodies the invention adapted for use at the rear of an automobile.
Figure 2:
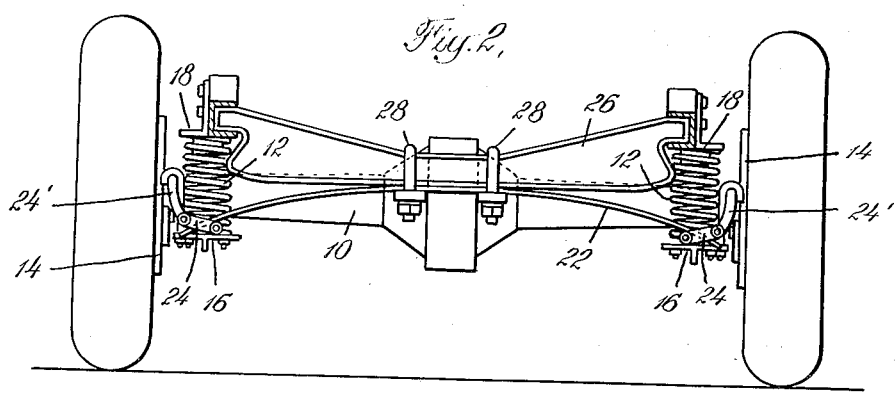
Fig. 2 is a rear view showing the axle and spring assemblies of Fig. 1.
Figure 3:
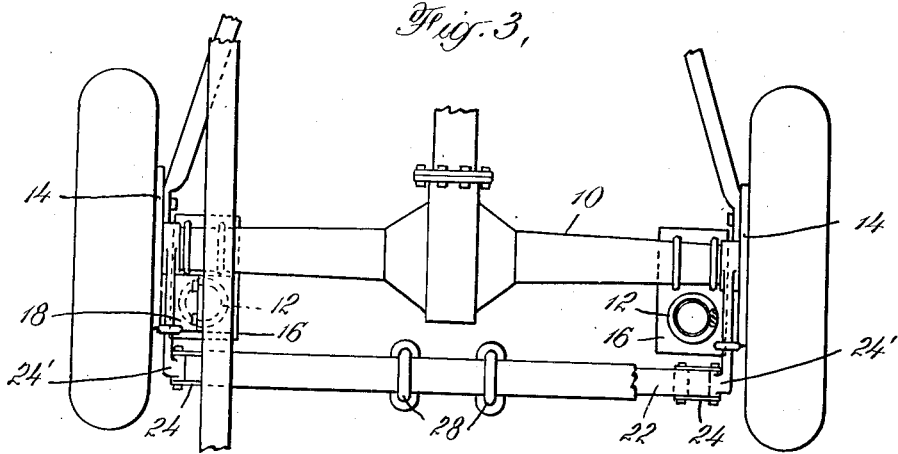
Fig. 3 is a plan view of the spring and axle assemblies of Figs. 1 and 2.

In the assembly illustrated, there is provided at each end of the axle housing 10 a helical spring 12. These helical springs are mounted as far apart as the brake assembly 14 will permit. The helical springs are mounted between brackets 16 provided on the axle housing and brackets 18 provided on the frame. A rubber bumper 20 is provided on the frame above the axle housing to prevent contact between the frame and the axle housing if an exceptionally severe bump is encountered.

The stiffness or compression rate of the helical springs 12 should be such that these springs carry the normal weight of the vehicle, but should be insufficient to prevent contact between the rubber bumper 20 and the axle housing when a relatively severe bump is encountered.

Figure 4:
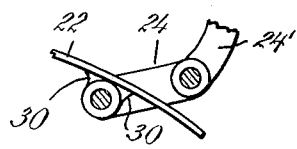
Fig. 4 is an enlarged view showing a preferred form of shackle used for the mounting of the supplemental spring members.

A supplemental spring member 22 is also provided. This is connected at each extremity to the axle housing by shackles 24, attached to brackets 24', or suitably mounted in other ways. The detailed construction of these shackles is shown in Fig. 4 and will be further explained. The member 22 is anchored to the frame cross member 26 at the center of the U bolts 28. The cross member 26 is of such shape that as the distance between the frame and the axle is decreased, the member 22 flattens progressively against the cross member, so that its effective length is more or less proportionately shortened. Its resistance to deformation thus increases; in more or less geometrical progression as the distance between the frame and the axle decreases; whereas the resistance of the helical springs 12 increases only in arithmetical progression as the distance between the frame and the axle decreases. Thus if the shock is a light one, most of it is absorbed by the helical springs and little by the member 22; whereas if the shock is a severe one, much of it is absorbed by the supplemental spring 22.

While the connection between the spring member 22 and the shackle 24 may be of the nature of those commonly used in mounting leaf springs, that is, with the end of the member 22 wrapped around the bushing of the shackle, there are important advantages in the use of a construction such as that illustrated in Fig. 4. In this construction, the member 22 extends through the shackle 24. At a distance from the end of the member 22 greater than that between axle centers of the shackle, a bushing is welded to the member 22 which serves as one bearing of the shackle, as shown at 30. Advantageously, such shackles are made with a greater distance between axle centers than is common practice in constructing spring shackles. The distance between axle centers may, for example, advantageously be three or four inches, or even somewhat more. With such construction, the possibility of the shackle and the member 22 coming into alignment when the axle moves away from the frame is prevented, and the snubbing action of the member 22 is cushioned. The movement of a shackle made in accordance with ordinary practice may readily be so limited as to prevent the shackle and the member 22 from coming into alignment by means of a suitable stop; but such construction requires the provision of an extra part; and its action would tend to be such as to impart a shock which might be objectionable.

The spring suspension illustrated in the drawing, will, of course, be supplemented by a suitable shock absorbing system, such as is ordinarily used on automobiles. The shock absorbers commonly provided may require adjustment in view of the difference in resistance between the new spring suspensions and ordinary spring suspensions; but the proper setting of the shock absorbers is readily determined by experiment.

The following example outlines spring characteristics found extremely satisfactory for the use of the new spring suspension described in connection with the drawing for the rear suspension of a Ford automobile. This automobile has, unloaded, a total weight on the rear wheels of 1350 pounds, with a sprung weight of 1104 pounds. The normal distance between the rubber bumpers and the axle housing is four inches. Each helical spring, with the car standing and no passengers, has a length of 10¼ inches and has a compression rate of 138 pounds per inch. The supplemental spring, with the car standing and no passengers, carries little or no load. When the distance between the axle housing and the rubber bumper is reduced to three inches, the supplemental spring carries 100 pounds; when this distance is reduced another inch, the supplemental spring carries 200 pounds; when it is reduced to one inch, the supplemental spring carries 375 pounds; and at the point where the rubber bumpers come into contact with the axle housing, that is, when the normal distance between the axle housing and the frame is reduced by four inches, the supplemental spring carries 750 pounds. The car is provided with double-acting hydraulic shock absorbers, adjusted by individual preference.

The riding qualities of the car so provided with the new spring suspension are greatly improved. It holds the road well at all speeds, has characteristics corresponding to those of a car with soft springs when riding on smooth or slightly rough roads, and corresponding to those of an automobile with hard or stiff springs when riding over a rough road. It has little tendency to sway or lean. It has quite uniform riding qualities, whether carrying a light load or a heavy load.

I claim:

1. In combination in a spring suspension for vehicles, an axle assembly, a spring positioned adjacent a wheel adapted to support at least the major portion of the normal sprung weight at said wheel, a supplemental arcuate spring member fastened to the frame of the vehicle and to the axle assembly, a frame member above and adjacent to said supplemental spring member and aligned therewith in such position that as the distance between the frame and the axle housing is decreased, the supplemental spring member progressively flattens into contact with said frame member, said supplemental spring member carrying an increasing proportion of the load on the spring assembly as the distance between the axle housing and the frame decreases.

2. In combination in a spring suspension for one end of a vehicle, an axle housing, at least one spring adapted to support at least the major portion of the normal sprung weight, a supplemental arcuate spring member mounted transversely of the vehicle, said supplemental spring member being fastened to the frame at about its mid-point and at its ends to opposite extremities of the axle housing, and a member rigidly fastened to the frame of the vehicle above said spring member and in alignment therewith, said supplemental spring member carrying an increasing proportion of the load on the spring assembly as the distance between the axle housing and the frame decreases.

3. A combination as in claim 2, in which the member rigidly fastened to the frame above the supplemental spring member is a cross member of the frame, and in which the supplemental spring member is rigidly fastened to said cross member about its mid-point.

4. A combination as in claim 1, in which the supplemental member is fastened to the axle assembly by a shackle.

5. A combination as in claim 2, in which the supplemental spring member is fastened at its ends to the axle housing by shackles.

6. A spring assembly for one end of a vehicle having an axle assembly comprising helical springs mounted at opposite ends of the axle assembly and adapted to support at least the major portion of the normal sprung weight, a supplemental arcuate spring member mounted transversely of the vehicle and fastened to the frame of the vehicle at about its mid-point and to the opposite extremities of the axle assembly at its ends, and a member above said supplemental spring member and in alignment therewith rigidly fastened to the frame, said supplemental spring member carrying an increasing proportion of the load on the spring assembly as the distance between the axle housing and the frame decreases.

7. A combination as in claim 2, in which the springs adapted to support the major portion of the normal sprung weight are helical springs.

8. A combination as in claim 1, in which the supplemental spring member is fastened to the axle assembly by a shackle provided with bushings and in which the end of the suplemental spring member extends between the pivots of the shackle, said member being welded to one of the bushings of said shackle, and the other bushing of the shackle being fastened to the axle housing of the vehicle.

GORDON WALCOTT CROWELL.